(12) United States Patent
Bögl

(10) Patent No.: US 9,604,547 B2
(45) Date of Patent: Mar. 28, 2017

(54) VEHICLE FOR A MAGNETIC LEVITATION TRACK

(71) Applicant: MAX BÖGL BAUUNTERNEHMUNG GMBH & CO. KG, Sengenthal (DE)

(72) Inventor: Stefan Bögl, Sengenthal (DE)

(73) Assignee: Max Bögl Bauunternehmung GmbH & Co. KG, Sengenthal (DE)

( * ) Notice: Subject to any disclaimer, the term of this patent is extended or adjusted under 35 U.S.C. 154(b) by 278 days.

(21) Appl. No.: 14/363,454

(22) PCT Filed: Dec. 7, 2012

(86) PCT No.: PCT/EP2012/074745
§ 371 (c)(1),
(2) Date: Jun. 6, 2014

(87) PCT Pub. No.: WO2013/083755
PCT Pub. Date: Jun. 13, 2013

(65) Prior Publication Data
US 2015/0040791 A1    Feb. 12, 2015

(30) Foreign Application Priority Data
Dec. 8, 2011  (DE) .................. 10 2011 056 180

(51) Int. Cl.
*B60L 13/00* (2006.01)
*B60L 13/10* (2006.01)
(Continued)

(52) U.S. Cl.
CPC ............... *B60L 13/10* (2013.01); *B60L 13/04* (2013.01); *B61B 13/08* (2013.01); *B61D 1/00* (2013.01); *B61F 1/00* (2013.01); *B60L 13/08* (2013.01)

(58) Field of Classification Search
CPC .......... B60L 13/10; B60L 13/04; B60L 13/08; B61D 1/00; B61F 1/00; B61B 13/08
See application file for complete search history.

(56) References Cited

U.S. PATENT DOCUMENTS 3,937,148 A * 2/1976 Simpson ................. B60L 13/04
                                                   104/283
4,029,020 A * 6/1977 Nakamura ............ B60L 13/035
                                                   104/284
(Continued)

FOREIGN PATENT DOCUMENTS

CN        101062662       10/2007
DE        28 11 161        9/1979
(Continued)

OTHER PUBLICATIONS

German Patent Office Search Report, Dec. 3, 2012.
PCT International Preliminary Report on Patentability, Jun. 10, 2014.

*Primary Examiner* — Jason C Smith
(74) *Attorney, Agent, or Firm* — Dority & Manning, P.A.

(57) ABSTRACT

The present invention relates to a vehicle for a magnetic levitation track having a coach body (1) and a propulsion and supporting device (4) as well as at least one levitation frame (2) fastened on the coach body (1) and the propulsion and supporting device (4). The levitation frame (2) can be deflected transversely to the longitudinal axis of the propulsion and supporting device (4) and a spring suspension system (12, 14, 20, 21) is arranged between the levitation frame (2) and propulsion and supporting device (4). The levitation frame (2) has a traverse (13) and a carrier (17) which are connected to each other in an articulated fashion.

16 Claims, 4 Drawing Sheets

(51) Int. Cl.
*B61B 13/08* (2006.01)
*B60L 13/04* (2006.01)
*B61D 1/00* (2006.01)
*B61F 1/00* (2006.01)
*B60L 13/08* (2006.01)

(56) References Cited

U.S. PATENT DOCUMENTS

| | | | | |
|---|---|---|---|---|
| 4,641,586 A | * | 2/1987 | Miller | B60L 13/035 104/284 |
| 5,904,101 A | * | 5/1999 | Kuznetsov | B60L 13/10 104/130.02 |
| 6,131,520 A | | 10/2000 | Düll | |
| 7,404,361 B2 | * | 7/2008 | Nast | B60L 13/10 104/281 |
| 7,458,323 B2 | * | 12/2008 | Nast | B60L 13/10 104/282 |
| 8,430,037 B2 | | 4/2013 | Miller et al. | |
| 2015/0040791 A1 | * | 2/2015 | Bogl | B61B 13/08 104/286 |

FOREIGN PATENT DOCUMENTS

| | | |
|---|---|---|
| DE | 31 04 125 A1 | 8/1982 |
| EP | 0 831 004 | 3/1998 |
| JP | 57-55704 | 4/1982 |
| JP | 2009 254 099 | 10/2009 |
| KR | 10-2011-00541676 | 5/2011 |

* cited by examiner

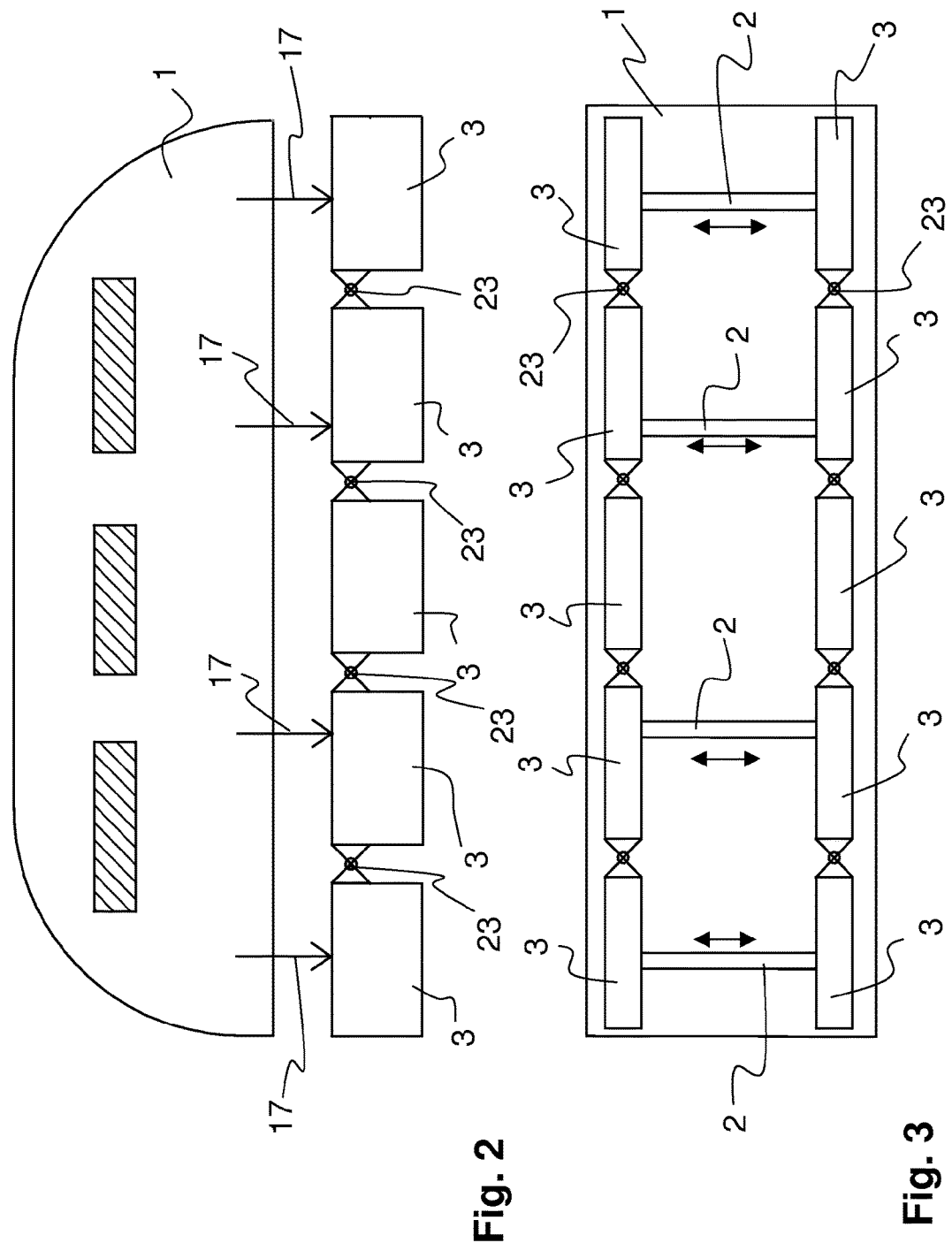

VEHICLE FOR A MAGNETIC LEVITATION TRACK

FIELD OF THE INVENTION

The present invention relates to a vehicle for a magnetic levitation track having a coach body and a propulsion and supporting device, as well as at least one levitation frame fastened on the coach body and the propulsion and supporting device. The levitation frame can be deflected transversely to the longitudinal axis of the propulsion and supporting device and a spring suspension system is arranged between the levitation frame and propulsion and supporting device.

BACKGROUND

As a rule, vehicles of a magnetic levitation track feature an essentially rigid coach body, to which propulsion and supporting devices are attached. The propulsion and supporting devices must follow the track, and therefore also be able to follow the radius of the track according to the given space curve. In addition, the permissible gaps between the propulsion and supporting devices of the vehicle and the track are extremely low, such that, particularly if there are smaller radii of the track, the propulsion and supporting devices must be designed as mobile relative to the coach body. As such, the kinematics requires mobility between the coach body and the drive. The mobility of the propulsion and supporting devices relative to the coach body can be 90 mm or more.

The type of mounting of the propulsion and supporting device in relation to the coach body is significant for the driving comfort of the people traveling in the coach body. As such, in order to enable the most comfortable ride for the passengers of the coach body, the propulsion and supporting devices are equipped with spring suspension systems, which are able to gently and evenly absorb both the centrifugal forces and the transverse offset of the propulsion and supporting device in relation to the coach body.

A spring suspension system, by which a part of the propulsion and supporting system is supported on leaf springs, is known from DE 28 11 161 A1. In addition, a vibration damper and a spring is provided on the side, in order to dampen the side movement of the vehicle caused by the track and external forces in a satisfactory manner, and in order to obtain a softer coupling between the vehicle and the track.

A vehicle that features modules that are shifted transversely at the coach body is known from U.S. Pat. No. 7,404,361 B2. The coach body is supported at each of the modules. Moreover, the modules feature means for the lateral guidance of the vehicle on the rail of the track and for the propulsion of the vehicle. The modules are connected to each other, and can be shifted relative to the coach body by a levitation device. Air springs, on which the coach body is mounted, are arranged at the junctions of the modules.

What is disadvantageous with the known solutions is, on the one hand, the low mobility of the propulsion and supporting device in respect of the coach body, allowing for relatively large radii of the track, and, on the other hand, a very costly structuring of the levitation device in terms of design.

SUMMARY

Thus, a task of the present invention is to create a structurally simple and very effective and comfortable option of shifting a propulsion and supporting device in reference to a coach body of a vehicle for a magnetic levitation track, which is also suitable for passing through very small radii.

The task is solved with a vehicle having the characteristics of the appended claims.

A vehicle for a magnetic levitation track in accordance with the invention features a coach body and a propulsion and supporting device. At least one levitation frame is attached to the coach body and the propulsion and supporting device, whereas the levitation frame can be deflected transversely to the longitudinal axis of the propulsion and supporting device. A spring suspension system is arranged between the levitation frame and the propulsion and supporting device. The levitation frame, preferably integrated with a pendulum, causes the propulsion and supporting device to be able to follow a track in the area of curves, without the rigid coach body being exposed to impermissible bending. Through the spring suspension system, centrifugal forces and tilting movements at the coach body are greatly reduced. Thereby, passengers in the coach body are able to travel comfortably. In accordance with the invention, the levitation frame features a traverse and a carrier, which are connected to each other in an articulated fashion. The coach body is attached to the carrier, while the traverse is connected to the propulsion and supporting device. Preferably, the traverse connects two opposing propulsion and supporting devices, which run in parallel along the longitudinal axis of the coach body, and are shifted together across the levitation frame. Thereby, it is particularly advantageous that a structurally very simple and nevertheless effective design of the levitation frame is carried out. In this manner, the application of force and the shifting of the individual components to each other are very easily possible.

With an advantageous embodiment of the invention, the levitation frame connects two propulsion and supporting devices running in parallel with each other. Particularly for vehicles that feature two propulsion and supporting devices running in parallel with each other, through the combination of these two propulsion and supporting devices, the levitation frame can bring about a simultaneous shifting of the two parallel propulsion and supporting devices.

If, advantageously, two propulsion and supporting devices running in parallel are connected to each other by means of support elements, such that a stable and accurate alignment of the propulsion and supporting devices to each other takes place. The propulsion and supporting devices are substantially responsible for the fact that the track gauge of the vehicle precisely satisfies the requirements. This is important for the disruption-free operation of magnetic levitation tracks. Through the support elements, the precise track gauge of the vehicle can be adjusted and adhered to.

If each of the support elements is connected to the propulsion and supporting devices in an articulated fashion at a vertical line running through the propulsion and supporting devices, particularly good damping and guidance features of the propulsion and supporting devices in relation to the coach body are achieved.

If at least one support element is arranged between the traverse and one of the propulsion and supporting devices, a good rigidity and at the same time a good guidance of the coach body with respect to the propulsion and supporting devices is enabled.

If a spring suspension system, operating essentially horizontally, in particular in a y-direction, and/or a spring suspension system, operating essentially vertically, in particular in a z-direction, is arranged between the levitation frame and the propulsion and supporting device, it is ensured in a favorable manner that the vehicle to propulsion and supporting device is suspended, and that a comfortable operation is enabled. The vehicle is firmly connected to the sliding frame. Just like the coach body, the levitation frame is cushioned through the suspension. Vibrations in both the y-direction and in z-direction can be absorbed very well.

As the suspension, one, preferably two air springs for each propulsion and supporting device has proven to be particularly advantageous. As required, the air springs may be varied in their hardness and rigidity, such that an additional opportunity for the comfortable operation of the vehicle is thereby provided.

In order to fulfill the kinematic requirements, it is provided that the traverse and the carrier are connected to each other by means of a pendulum. Through this, the vehicle is particularly kept quiet when driving along a curve.

If the traverse is firmly connected to the suspension and the propulsion and supporting device, the coach body is, together with the levitation frame, mounted on the suspension, and is therefore very comfortable to operate. Only the propulsion and supporting device is unsuspended in the vertical direction, apart from magnetic forces, but this slows the overall system by a small degree, due to its relatively small size.

If the pendulum is vertically arranged under the propulsion and supporting device along with the suspension, this will also give rise to a system that is optimally suspended in a vertical direction. However, the pendulum can also be, in an advantageous manner, arranged on its side, next to the suspension. This results in favorable installation space for the pendulum and its mobility.

It is especially advantageous if the traverse, two pendulums, and the carrier form a symmetric four-joint linkage. This ensures that the coach body always remains horizontal, even in a lateral deflection of the levitation frame. Through this four-joint linkage, a lateral inclination cannot take place. Inclinations of the vehicle can take place, if need be, through the suspension in the vertical direction, whereas the suspension can be controlled in order to minimize the inclination.

If the essentially horizontally operating spring suspension system for each propulsion and supporting device features at least one damper connected to the carrier and at least one spring connected to the traverse, lateral shocks and forces, which may arise on the one hand from the vehicle to the propulsion and supporting device, and on the other hand, in reverse, from the propulsion and supporting device to the vehicle, are largely eliminated. Through this spring suspension mounting, the propulsion and supporting device also has the possibility to adjust to the route of the track and to compensate for small variations.

If the propulsion and supporting device is connected to the traverse through a spring suspension system operating essentially vertically in a z-direction, shocks and oscillating motions are to be very easily absorbed in a vertical direction.

Preferably, several, preferably more than five propulsion and supporting devices are arranged on both sides of the coach body. As a rule, propulsion and supporting devices are provided below the coach body, and extend along a line strung together on both sides of the coach body. Thus, they support the vehicle essentially along its entire length.

If the propulsion and supporting devices of a side are connected to each other with articulated joints, they can also follow tight curve radii of the track. The articulated joints enable optimal adjustment of the propulsion and supporting devices to the course of the track. In contrast to the rigid coach body, they are connected to each other in a type of link chain. The articulated joints are primarily swivel joints, but can also be designed in such a manner that they allow small lateral shifts.

For an optimal distribution of force, and a simple shift and adjustment of the location of the propulsion and supporting devices or the levitation frames, as the case may be, it is provided that a levitation frame is not arranged on the middle propulsion and supporting device. Thus, the middle propulsion and supporting device is aligned independently, i.e., without any direct connection to the parallel middle propulsion and supporting device of the other side of the vehicle after the previous and subsequent propulsion and supporting device or the track, as the case may be. The corresponding arrangement of the levitation frames on the other propulsion and supporting devices ensures that there is sufficient guidance of the propulsion and supporting device, or of the vehicle, as the case may be, on the track, and that impermissible tolerances or loads do not arise. Through the corresponding arrangement of the levitation frames, they can be deflected laterally enough to be able to go through tight curves of the track.

In one advantageous embodiment, a set-off device and/or a collector device is arranged on the propulsion and supporting device. Particularly for the use of short-stator linear drives, it is necessary for the vehicle to be supplied with power. This can be effected through the collector device, which is gripped by the propulsion and supporting device. The collector device is preferably arranged at the bottom side of the propulsion and supporting device. However, it can also be located at the side or at the top.

Moreover, in the event of the braking or standstill of the vehicle, it must be ensured that there is no damage to the vehicle or the track. Accordingly, a set-off device is provided, which is advantageously arranged on the propulsion and supporting device.

BRIEF DESCRIPTION OF THE DRAWINGS

Additional advantages of the invention are described in the following embodiments. The following is shown:

FIG. 2 a schematic side view of a vehicle in accordance with the invention,

FIG. 3 a view of the vehicle from the bottom in an outlined representation,

DETAILED DESCRIPTION

Figure 1:
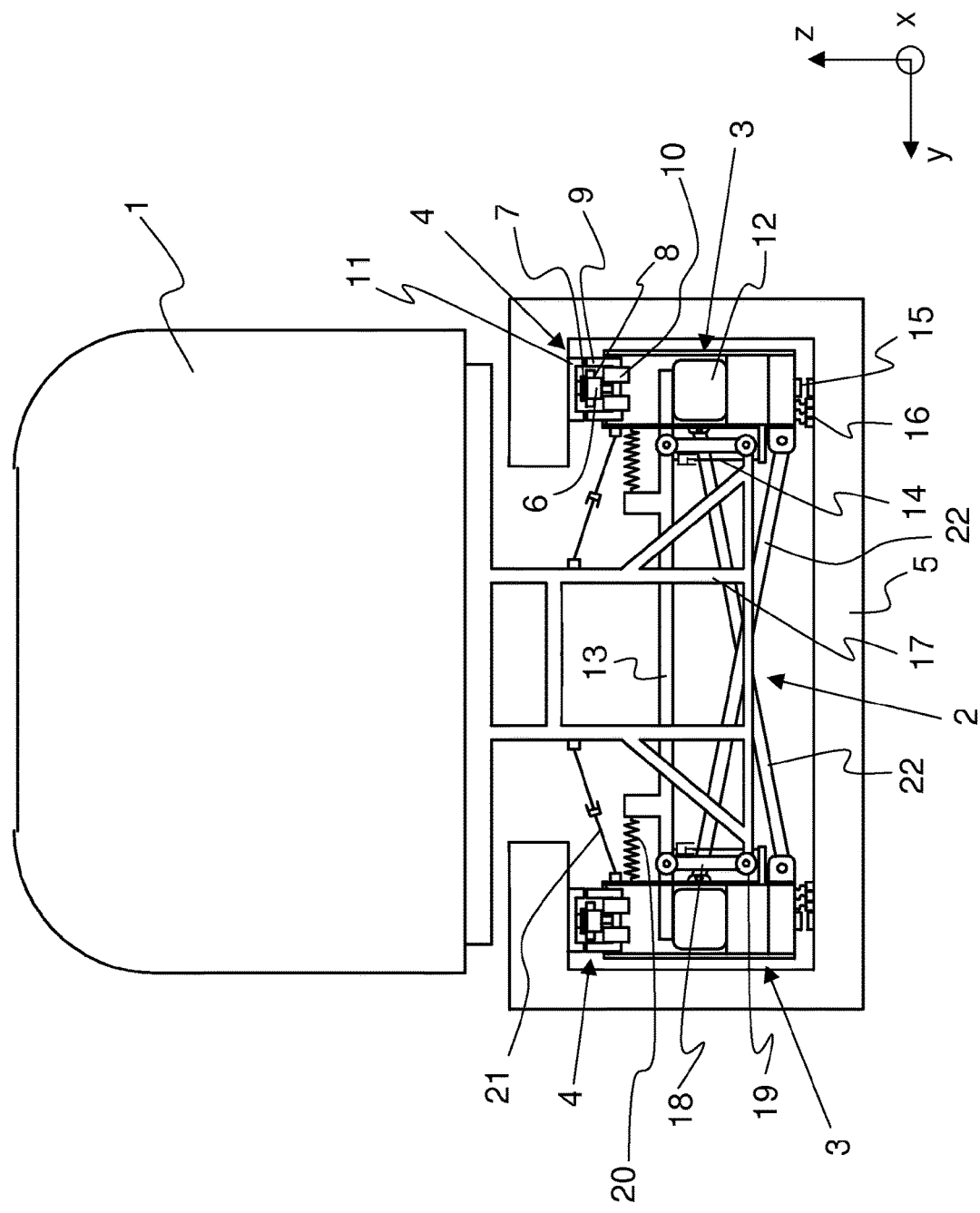
FIG. 1 a cross-section of a vehicle in accordance with the invention of a magnetic levitation track and its track carrier.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a cross-section of a vehicle in accordance with the invention of a magnetic levitation track with a coach body 1, a levitation frame 2, and modules 3, in which propulsion and supporting devices 4 are arranged. The vehicle is guided in a track carrier 5, which surrounds the modules 3 and the levitation frame 2 in a C-shaped form. The propulsion and supporting device 4 features parts of a linear motor and a supporting device. The linear motor, here a short-stator linear motor, includes an iron core 6 and a reaction rail 7. Windings 8 are embedded in the iron core 6. The linear motor is surrounded by a U-shaped yoke 9 and coils 10 along with a U-shaped reaction rail 11 connected with it. The two reaction rails 7 and 11 are attached to the track carrier 5. The iron core 6 and windings 8, along with the yoke 9 and coils 10, are found on the vehicle or the propulsion and supporting device 4, as the case may be. While the supporting device ensures that the vehicle is in a levitated state by, with a power supply of the supporting device, pulling the yoke 9 at the reaction rail 11, the linear drive, with the iron core 6, winding 8 and reaction rail 7 provides for a propulsion of the vehicle along an x-axis.

The propulsion and supporting device 4 is arranged with respect to the parts attached to the vehicle in the module 3. The module 3 also includes an air spring 12, which connects a traverse 13 of the levitation frame 2 in a springing manner with the module 3. Depending on the design, two or more air springs 12 may be used. The suspension is primarily in a z-direction, i.e. in a vertical direction. Moreover, there is also a damper 14 provided between the module 3 and the traverse 13; together with the air spring 12, this gives rise to a spring suspension system, through which the vehicle or the coach body 1, as the case may be, is elastically mounted in a vertical z-direction in respect of the module 3.

Furthermore, a set-off device 15 and a collector device 16 are provided at the module 3. The set-off device 15 is necessary in order to be able to set off the vehicle at a standstill or upon braking in a preset manner. The set-off device 15 widens, for example, guide rails, which are fastened on the one hand to the module 3 and on the other hand to the track carrier 5, and interact when setting off. The collector device 16 ensures that power lines that are laid along the track carrier 5 can be gripped by the vehicle, and a power supply of the propulsion and supporting device is ensured. In the event that the vehicle itself features a power generation device, such collector devices, which are laid across the entire track carrier 5, are not necessary.

The levitation frame 2 features, in addition to the traverse 13, a carrier 17. The carrier 17 is connected to the traverse 13 by means of two pendulums 18. The connection between the traverse 13, the two pendulums 18, and the carrier 17 takes place by means of four swivel joints 19. Through this four-joint system, an inclination-free, lateral shift of the coach body 1, which is attached to the carrier 17, is possible. This allows for a very comfortable operation of the vehicle. In order to prevent a build-up of the coach body 1, a spring suspension system is arranged in the horizontal y-directions. This spring suspension system features a spring 20, which is arranged between the module 3 and the traverse 13, along with a damper 21 between the module 3 and the carrier 17.

In order to ensure the stability of the two modules running parallel to each other, several support elements 22 are provided. The support elements 22 connect the two opposing modules 3 in a stable manner, such that they remain in an upright position and are always parallel to each other. Thereby, the track gauge of the vehicle can be adjusted in accordance with the specifications of the track.

The depiction of FIG. 1 shows a cross-section through the vehicle in accordance with the invention. The vehicle features several such levitation frames 2 and modules 3, which are connected to the coach body 1. As the coach body 1 is usually designed to be rigid, for the propulsion and supporting device 4, which also must be able to follow a curved track carrier 5, to adhere to the required space curve, it is necessary that it can be deflected transversely to the longitudinal axis of the vehicle or to the x-direction in a horizontal y-direction in respect of the coach body 1. This is ensured by the traverse 13, which is ensured by the four-joint linkage, consisting of the pendulum 18, the swivel joints 19, the traverse 13 and the carrier 17. While the carrier 17, which is firmly connected to the rigid body 1, is constant in the y-direction, the modules 3 are designed to be shifted relative to the carrier 17 in a y-direction. Thereby, the modules 3 with the propulsion and supporting devices 4 arranged thereon can be aligned with the the track carrier 5, without this giving rise to obstructions or tension with the coach body 1.

A vehicle in accordance with the invention in a side view is outlined in FIG. 2; it consists of a coach body 1 and modules 3 arranged thereon. In a manner that is not presented here, the track 5 engages between the coach body 1 and the modules 3, and carries the vehicle. The coach body 1 is attached through the carriers 17 to four of the five modules 3. The carriers 17 are outlined by the arrows that are shown. The middle one of the five modules 3 has no direct connection to the coach body 1, allowing for a tension-free ride, even on tight curves of the track carrier 5. As the middle module 3 would have to allow for the strongest deflection when driving along a curve, a particularly tension-free mobility of the middle module 3 is thereby ensured. However, through the locally uneven arrangement of the carriers 17 on the modules 3, an even weight distribution of the coach body 1 on the various modules 3 is possible. Thereby, the individual modules 3 are evenly burdened with the weight of the vehicle.

The modules 3 are connected to each other by means of articulated joints 23. These articulated joints 23, in particular ball joints, allow for a rotation of the neighboring modules 3 to each other.

FIG. 3 shows a view of the underside of the vehicle in an outlined representation. It is evident from this that each of the two rows is arranged with five modules 3 under the coach body 1. Each row is connected to the articulated joints 23. Each of the two outer modules 3 is connected to the levitation frames 2. Thereby, a shift in the direction of the double arrows of the modules 3 relative to the longitudinal axis of the coach body 1 is possible. However, the two modules 3 connected to the levitation frame 2 remain parallel to each other, which ensures precise guidance of the vehicle on the track carrier 5.

Figure 4:
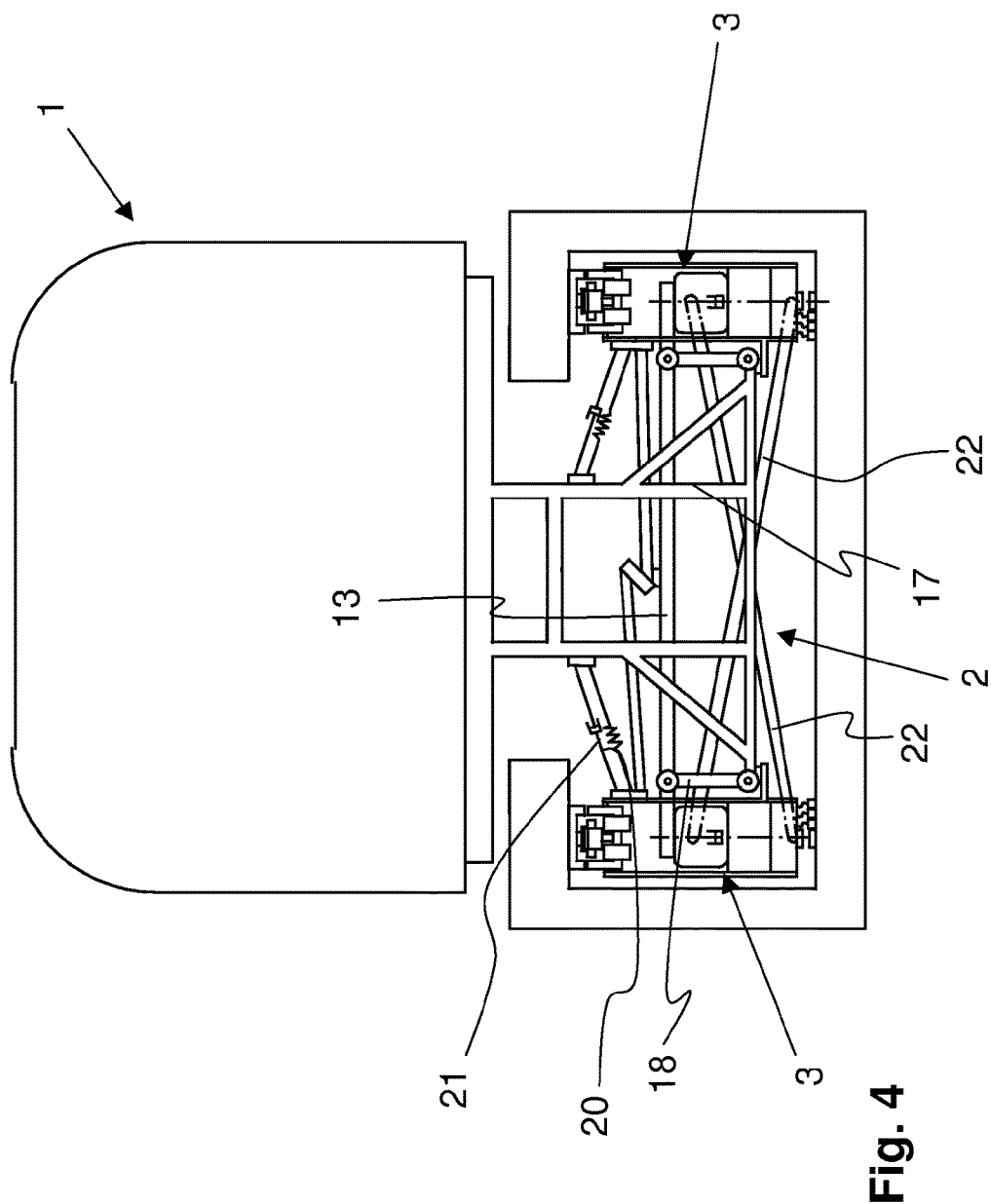
FIG. 4 an additional cross-section of a vehicle in accordance with the invention and FIG. 5 an additional cross-section of a vehicle in accordance with the invention

FIG. 4 shows a variation of FIG. 1 of the cross-section through a vehicle in accordance with the invention. Thereby, the pivot points of the support elements 22 are arranged in the central axis of the air springs 12, i.e., each of the support elements 22 is connected in an articulated manner to the propulsion and supporting devices on a vertical line running through the propulsion and supporting devices 3. This results in a tension-free and torque-free mobility of the device. In this connection, the spring suspension combination 20, 21 is also arranged between the carrier 17 of the levitation frame 2 and the module 3. There is a swivel joint arrangement 24 between the two modules 3. As a whole, driving comfort is further improved by such a structure of the vehicle, compared to the structure of FIG. 1.

Figure 5:
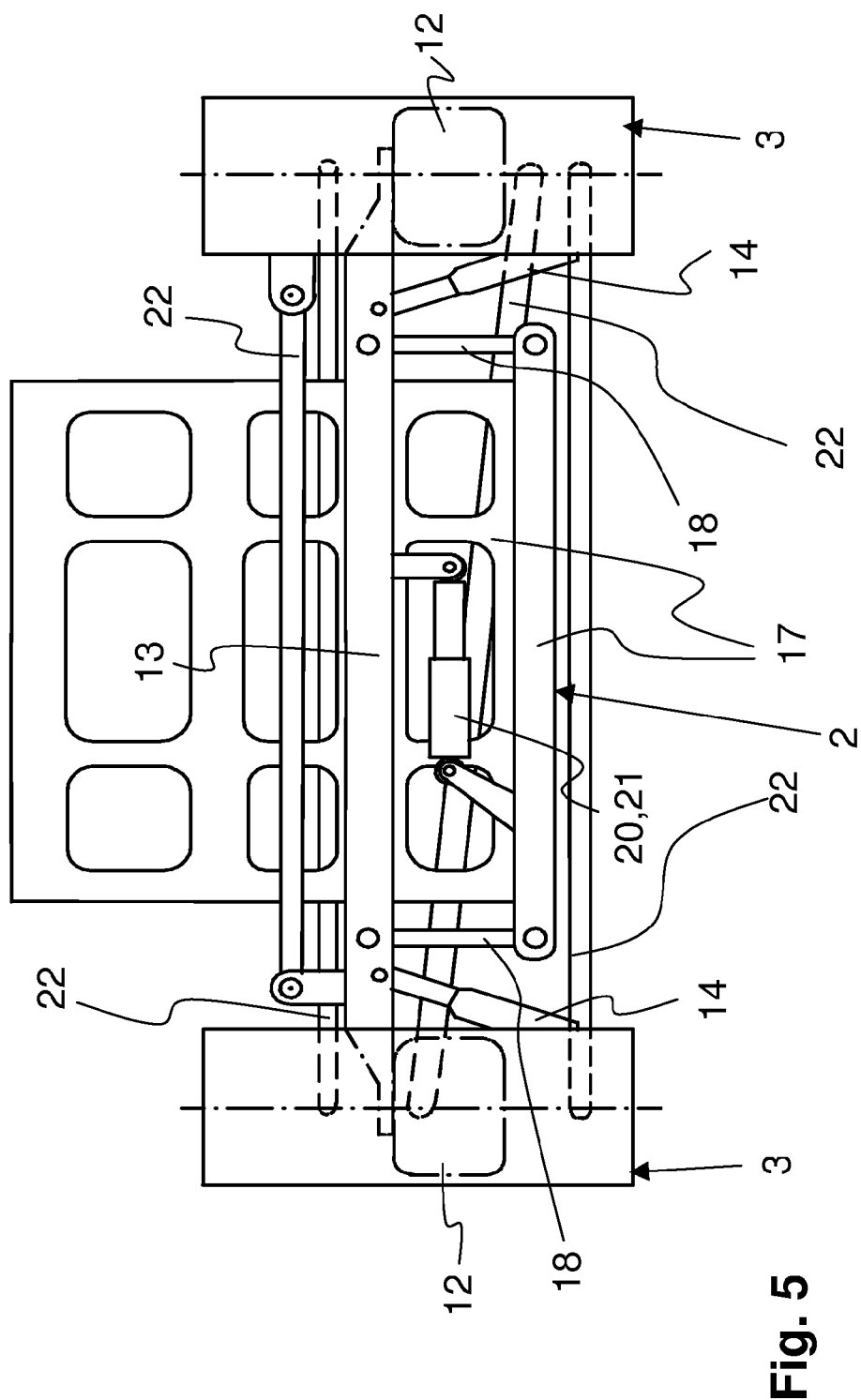

A further embodiment of the invention is shown in FIG. 5. A support element 22 connects a module 3 with the traverse 13. In addition, the traverse 13 is connected through a spring suspension system 20, 21 to the carrier 17 of the levitation frame 2. Thereby, the swinging movement of the levitation frame 2, for example, when driving along a curve, is dampened.

The invention is not limited to the presented embodiments. In particular, within the framework of the invention, the distribution of the levitation frames 2 on the coach body 1, or the exact execution with the spring suspension systems that are presented, may vary.

The invention claimed is:

1. A vehicle for a magnetic levitation track, comprising:
   a coach body;
   the coach body connected to a levitation frame;
   at least one propulsion and supporting device configured with the coach body;
   the levitation frame deflectable transversely to a longitudinal axis of the propulsion and supporting device;
   a spring suspension system arranged between the levitation frame and the propulsion and supporting device;
   the levitation frame further comprising a carrier on which the coach body is mounted; and
   the levitation frame further comprising a traverse connected directly to the propulsion and supporting device, the traverse connected to the carrier in an articulated manner at two spaced apart locations.

2. The vehicle as in claim 1, comprising two of the propulsion and supporting devices configured in parallel along opposite sides of the coach body, the traverse connected between the two propulsion and supporting devices.

3. The vehicle as in claim 2, wherein the two propulsion and supporting devices are connected to each other by support elements.

4. The vehicle as in claim 3, comprising at least two of the support elements, wherein the support elements are connected to each of the two propulsion and supporting devices in an articulated manner at a vertical line through the propulsion and supporting devices.

5. The vehicle as in claim 4, further comprising an additional wherein support element arranged between the traverse and at last one of the propulsion and supporting devices.

6. The vehicle as in claim 2, further comprising a spring suspension system operable in either or both of a horizontal and a vertical configured between the levitation frame and the propulsion and supporting devices.

7. The vehicle as in claim 6, wherein the spring suspension system comprises at least two vertically operating air springs configured with each propulsion and supporting device.

8. The vehicle as in claim 6, wherein the traverse is connected to the spring suspension system and the propulsion and supporting devices.

9. The vehicle as in claim 8, further comprising a pendulum connecting the traverse and the carrier together at each of the spaced apart locations.

10. The vehicle as in claim 9, wherein a four-point symmetric linkage is formed by two pendulums, the carrier, and the traverse.

11. The vehicle as in claim 6, wherein the spring suspension system comprises a damper connected to the carrier and a horizontally acting spring connected to the traverse.

12. The vehicle as in claim 6, wherein the spring suspension system is vertically acting and connected between the traverse and each of the propulsion and supporting devices.

13. The vehicle as in claim 2, further comprising a plurality of the propulsion and supporting devices arranged along each side of the coach body and interconnected with articulated joints.

14. The vehicle as in claim 13, wherein the levitation frame is unconnected to a middle one of the propulsion and supporting devices along each side of the coach body.

15. The vehicle as in claim 2, further comprising a set-off device and a collector device arranged on the propulsion and supporting device.

16. A vehicle for a magnetic levitation track, comprising:
    a coach body;
    the coach body connected to a carrier;
    two propulsion and supporting device configured with the coach body;
    a levitation frame connected to the coach body, the levitation frame deflectable transversely to a longitudinal axis of the propulsion and supporting device;
    a spring suspension system arranged between the levitation frame and the propulsion and supporting device;
    the levitation frame further comprising a traverse connected to the propulsion and supporting device, the traverse connected to the carrier in an articulated manner;
    the two propulsion and supporting devices configured in parallel along opposite sides of the coach body, the traverse connected between the two propulsion and supporting devices;
    the two propulsion and supporting devices connected to each other by at least two support elements;
    the two support elements are connected to each of the two propulsion and supporting devices in an articulated manner at a vertical line through the propulsion and supporting devices; and
    an additional support element arranged between the traverse and at least one of the propulsion and supporting devices.

* * * * *